United States Patent [19]
Wilson et al.

[11] Patent Number: 6,017,060
[45] Date of Patent: Jan. 25, 2000

[54] PRESSURE RELIEF PLUG

[75] Inventors: John N. Wilson, Rochester; Steven Stoll, Mt. Clemens, both of Mich.

[73] Assignee: TRW Vehicle Safety Systems Inc., Lyndhurst, Ohio

[21] Appl. No.: 08/978,968

[22] Filed: Nov. 26, 1997

[51] Int. Cl.[7] .................................................. B60R 22/46
[52] U.S. Cl. ........................................ 280/806; 280/801.1
[58] Field of Search ................................ 280/801.1, 806

[56] References Cited

U.S. PATENT DOCUMENTS

| | | | |
|---|---|---|---|
| 4,927,175 | 5/1990 | Föhl | 280/806 |
| 5,411,291 | 5/1995 | Föhl | 280/806 |
| 5,450,723 | 9/1995 | Föhl | 280/806 |
| 5,468,019 | 11/1995 | Blase et al. | 280/805 |
| 5,653,398 | 8/1997 | Föhl | 242/374 |

*Primary Examiner*—Kenneth R. Rice
*Attorney, Agent, or Firm*—Tarolli, Sundheim, Covell, Tummino & Szabo L.L.P.

[57] ABSTRACT

An apparatus (10) includes a housing (70) defining a chamber (80). The housing (70) also defines a vent passage (86) communicating the chamber (80) with the atmosphere outside the housing. A gas generator (120) associated with the housing (70), when actuated, generates gas in the chamber (80). A pressure relief plug (140) blocks gas flow through the vent passage (86) when the pressure relief plug is at a first temperature. The pressure relief plug (140) is made of a material which melts at a second temperature above the first temperature causing the vent passage (86) to become unblocked. The pressure relief plug (140) is insertable into the vent passage (86) and has a snap action connection with the housing (70).

6 Claims, 3 Drawing Sheets

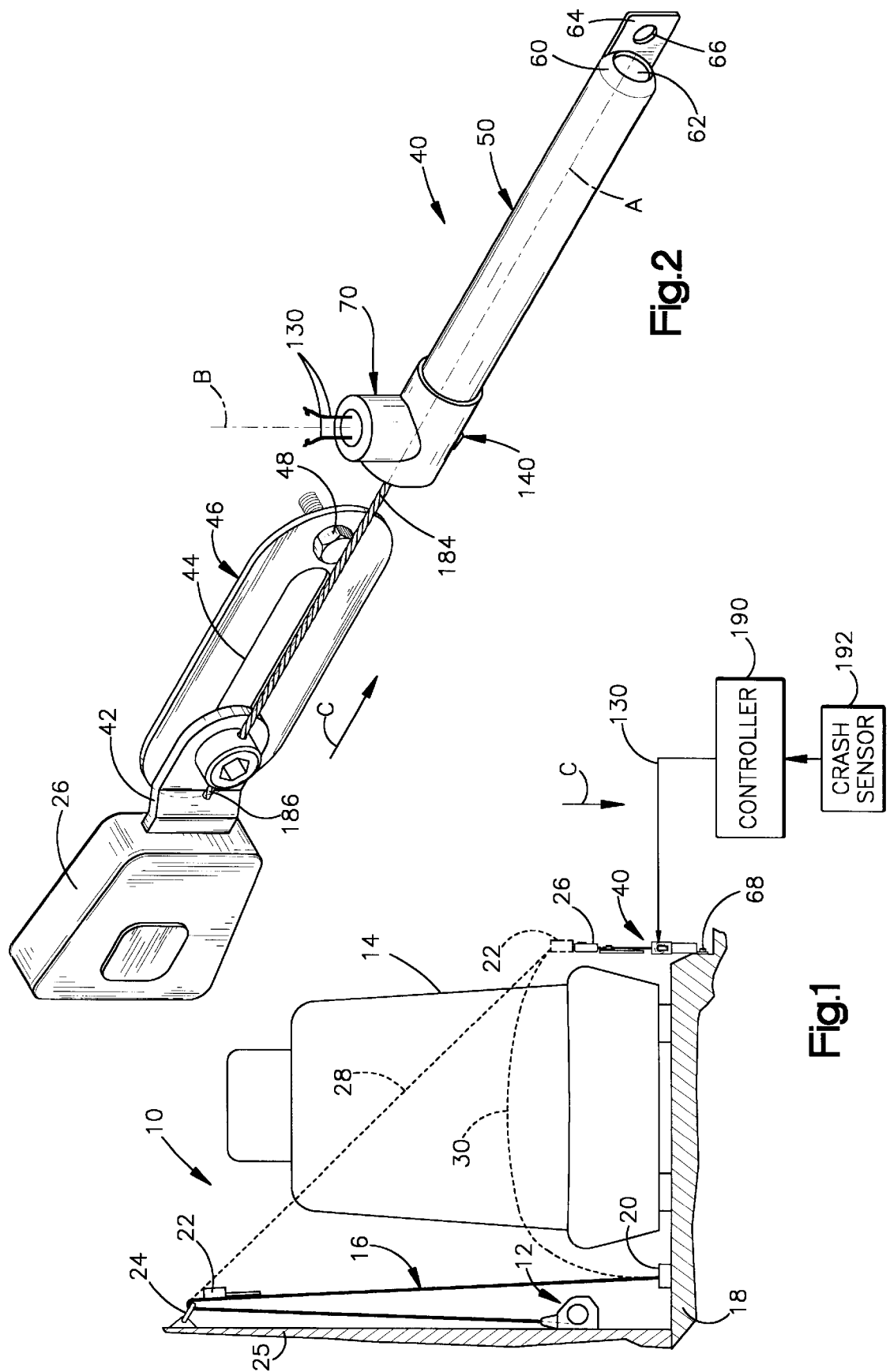

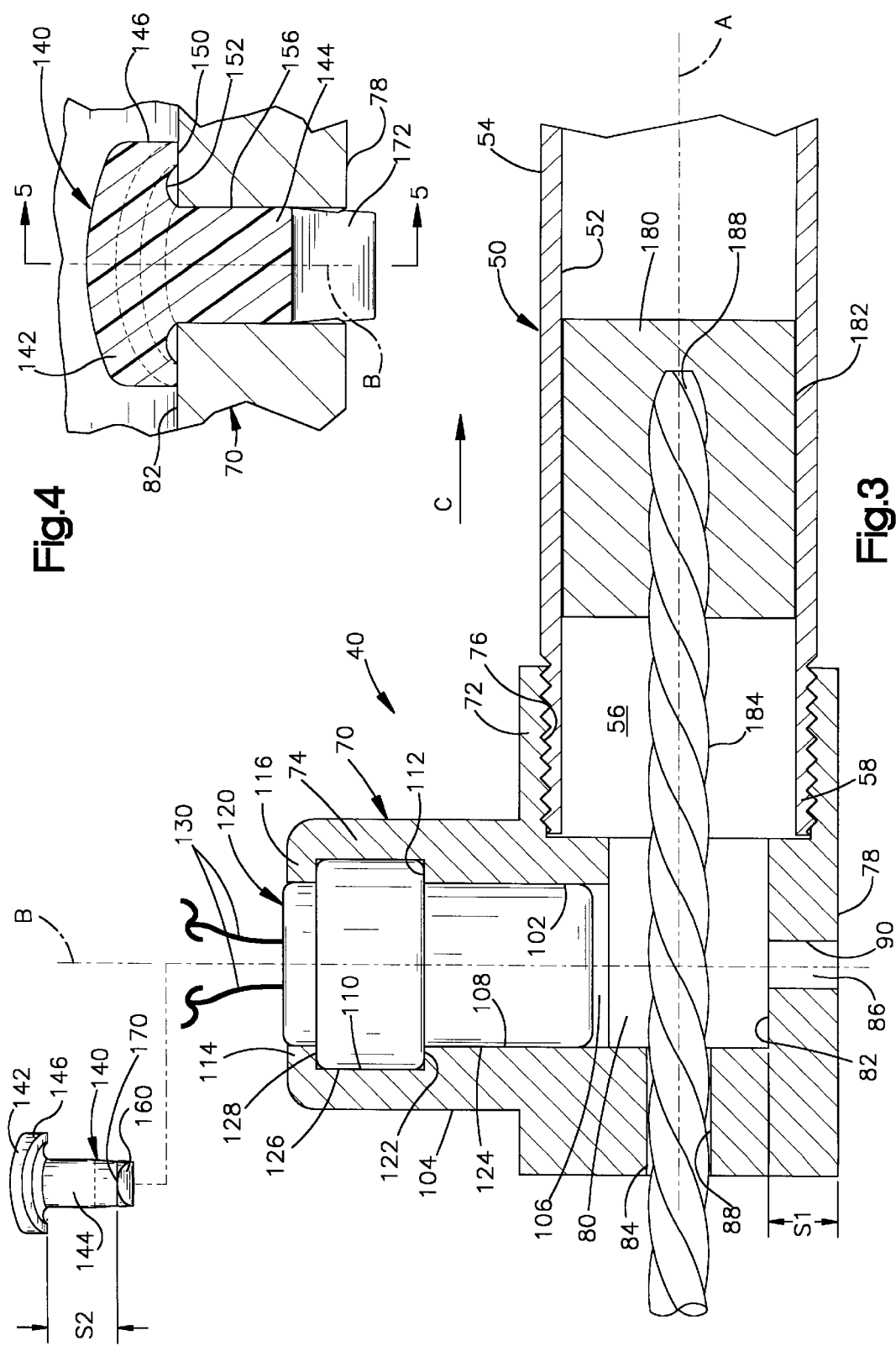

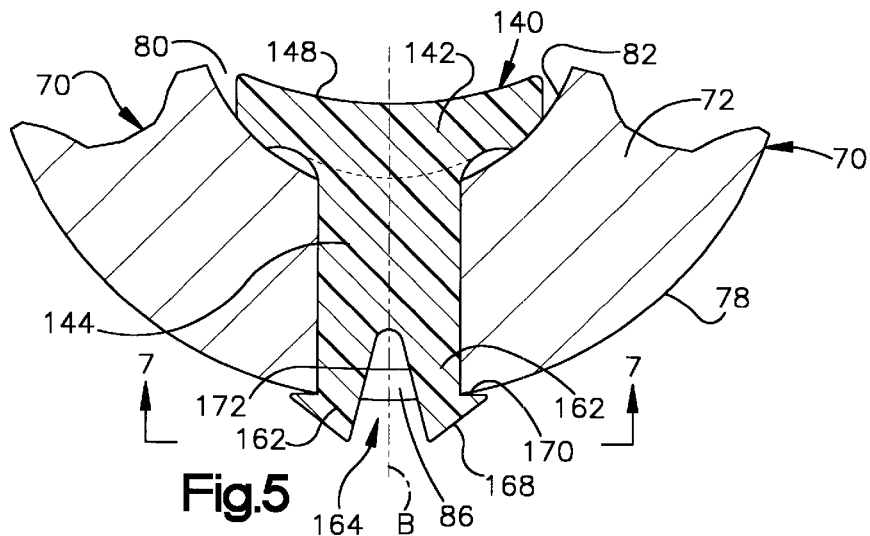
Fig.5
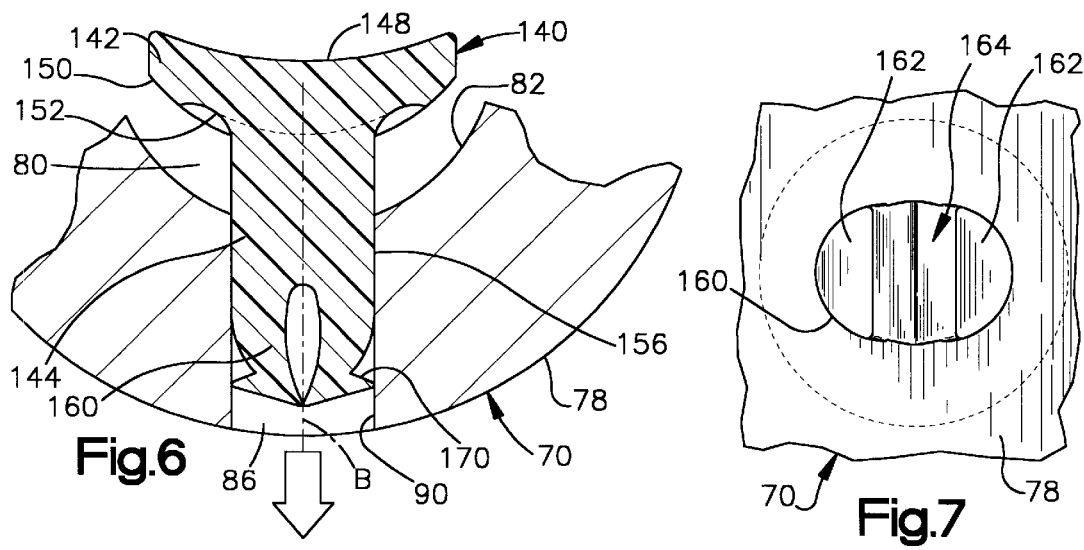
Fig.6
Fig.7
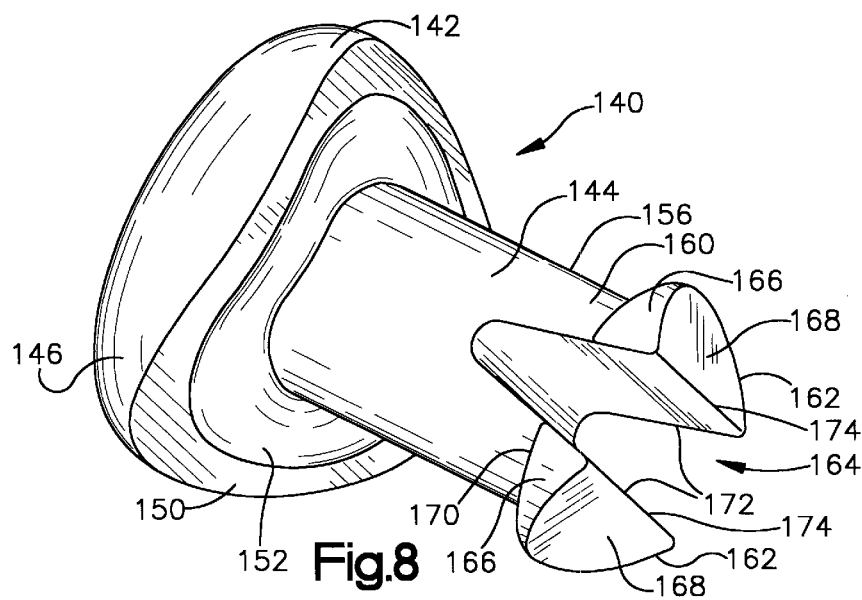
Fig.8

PRESSURE RELIEF PLUG

BACKGROUND OF THE INVENTION

1. Technical Field

The present invention relates to an apparatus which includes a housing having a chamber for receiving gas and a vent passage blocked by a pressure relief plug.

2. Description of the Prior Art

It is known in the art of vehicle occupant restraint systems to pretension seat belt webbing in the event of a vehicle collision. In one known system, the seat belt webbing is pretensioned by moving a buckle associated with the seat belt webbing through a pretensioning stroke. The pretensioning stroke is accomplished by actuating a pyrotechnic gas generator in a piston/cylinder device.

It is possible for the pyrotechnic material of the gas generator to auto-ignite at high temperatures. Such an auto-ignition would unnecessarily actuate the pretensioning device. Thus, it is desirable to vent the pressurized gas generated by a gas generator in a seat belt pretensioning device in the event of auto-ignition of the gas generator.

SUMMARY OF THE INVENTION

The present invention is an apparatus comprising a housing defining a chamber. The housing also defines a vent passage communicating the chamber with the atmosphere outside the housing. A gas generator associated with the housing, when actuated, generates gas in the chamber. A pressure relief plug blocks gas flow through the vent passage when the pressure relief plug is at a first temperature. The pressure relief plug is made of a material which melts at a second temperature above the first temperature causing the vent passage to become unblocked. The pressure relief plug is insertable into the vent passage and has a snap action connection with the housing.

The pressure relief plug has a circular head portion located in the chamber and a shank portion coaxial with the head portion and of a diameter smaller than the head portion. The shank portion has an end portion which includes a pair of legs which move toward each other upon insertion into the vent passage and which move away from each other when moved out of the passage.

BRIEF DESCRIPTION OF THE DRAWINGS

The foregoing and other features of the present invention will becomes apparent to one skilled in the art to which the present invention relates upon consideration of the following description of the invention with reference to the accompanying drawings, wherein:

FIG. 1 is a schematic illustration of a vehicle seat belt system having a pretensioning device with a pressure relief plug constructed in accordance with the present invention;

FIG. 2 is a perspective view of a portion of the pretensioning device of FIG. 1;

FIG. 3 is a partial sectional view of a portion of the pretensioning device of FIG. 2;

FIG. 4 is an enlarged sectional view of a portion of FIG. 3;

FIG. 5 is a view taken along line 5—5 in FIG. 4;

FIG. 6 is a view similar to FIG. 5 showing the pressure relief plug in a different position;

FIG. 7 is a view taken along line 7—7 in FIG. 5; and

FIG. 8 is a perspective view of the pressure relief plug illustrated in FIGS. 3–7.

DESCRIPTION OF A PREFERRED EMBODIMENT

The present invention relates to an apparatus which includes a housing having a chamber for receiving gas and a vent passage blocked by a pressure relief plug. The present invention is applicable to vehicle occupant restraint systems of various constructions. As representative of the present invention, FIG. 1 illustrates a three-point continuous loop seat belt system 10 for use in restraining an occupant of a vehicle.

The occupant of the vehicle sits on a vehicle seat 14 which is illustrated as a front passenger seat in the vehicle. A length of seat belt webbing 16 is extensible about the vehicle occupant. One end of the length of belt webbing 16 is anchored to the vehicle body 18 at an anchor point 20 located on one side of the seat 14. The opposite end of the belt webbing 16 is attached to a retractor 12 which is secured to the vehicle body 18 on the same side of the seat 14. Intermediate its ends, the belt webbing 16 passes through a tongue assembly 22 and a D-ring or turning loop 24 that is mounted to a B-pillar 25 above the retractor 12 and the anchor point 20. When the seat belt system 10 is not in use, the belt webbing 16 is wound on the retractor 12 and is oriented generally vertically on the one side of the seat 14, as shown in solid lines in FIG. 1.

To engage the seat belt system 10, the tongue assembly 22 is manually grasped and is pulled across the lap and torso of the occupant sitting in the seat 14. As the tongue assembly 22 is pulled across the lap and torso of the occupant, the tongue assembly moves along the belt webbing 16, and the belt webbing is unwound from the retractor 12. When the belt webbing 16 has been pulled across the lap and torso of the occupant, the tongue assembly 22 is connected with a buckle 26, as shown in dashed lines in FIG. 1. The buckle 26 is connected to the vehicle body 18 and is disposed on the side of the seat 14 opposite the anchor point 20. When the seat belt system 10 is thus buckled, the length of belt webbing 16 is divided by the tongue assembly 22 into a torso portion 28 which extends across the torso of the occupant and a lap portion 30 which extends across the lap of the occupant.

The seat belt system 10 includes a pretensioning device 40 which is operable to remove slack from the seat belt webbing 16 and to tension the seat belt webbing in the event of sudden vehicle deceleration such as occurs in a vehicle collision. The pretensioning device 40 (FIG. 2) has a slide 42 which is fixedly connected to the buckle 26. The slide 42 is movable along a longitudinal slot 44 in an anchor plate 46. The anchor plate 46 is secured to the vehicle body 18 by a bolt 48.

The pretensioning device 40 includes a cylindrical tubular member 50 and a housing 70 attached to the tubular member. The tubular member 50 is centered on an axis A and has parallel inner and outer surfaces 52 and 54, respectively (FIG. 3). The inner surface 52 defines a cylindrical piston chamber 56 in the tubular member 50. The tubular member 50 includes a first end portion 58 and a second end portion 60 having an open end 62 (FIG. 2). The outer surface 54 of the tubular member 50 in the first end portion 58 is threaded (FIG. 3).

A planar mounting flange 64 extends from the second end 60 of the tubular member 50. The mounting flange 64 has a centrally located opening 66 for receiving a bolt 68 (FIG. 1) to secure the tubular member to the vehicle body 18. The tubular member 50 is shown oriented vertically in FIG. 1, but the tubular member could be oriented horizontally or at an angle between horizontal and vertical.

The housing 70 has an L-shaped cross-section formed by cylindrical first and second portions 72 and 74, respectively, which are perpendicular to one another (FIG. 3). The first portion 72 of the housing 70 is centered on the axis A and has inner and outer surfaces 76 and 78, respectively. The inner surface 76 is threaded to match the threads on the outer surface 54 of the first end portion 58 of the tubular member 50.

A pressure chamber 80 is formed in the first portion 72 of the housing 70. The pressure chamber 80 is defined by a first cylindrical surface 82 in the first portion 72 of the housing 70 which is centered on the axis A. The first cylindrical surface 82 and the outer surface 78 in the first portion 72 of the housing 70 are spaced apart by a first distance S1. The pressure chamber 80 is in fluid communication with the piston chamber 56 in the tubular member 50.

The first portion 72 of the housing 70 includes an axial passage 84 and a radially extending vent passage 86. The axial passage 84 is centered on the axis A and is defined by a second cylindrical surface 88. The axial passage 84 is in fluid communication with the pressure chamber 80 in the housing 70. The vent passage 86 is centered on an axis B which is perpendicular to the axis A. The vent passage 86 is defined by a third cylindrical surface 90. It should be understood that the surface 90 defining the vent passage 86 could have a configuration other than cylindrical. The third cylindrical surface 90 has an inside diameter with a predetermined circumference where the vent passage meets the pressure chamber 80. The vent passage 86 is in fluid communication with the pressure chamber 80 and with the atmosphere outside the housing 70.

The second portion 74 of the housing 70 is centered on the axis B and has inner and outer surfaces 102 and 104, respectively. The inner surface 102 defines a combustion chamber 106 in the second portion 74 of the housing 70. The combustion chamber 106 intersects and is in fluid communication with the pressure chamber 80 in the first portion 72 of the housing 70. The inner surface 102 includes a cylindrical first surface portion 108 and a cylindrical second surface portion 110. The first and second surface portions 108 and 110 are connected by a radially extending, annular third surface portion 112. A terminal end portion 114 of the second portion 74 of the housing 70 forms a crimpable flange 116.

The pretensioning device 40 includes a pyrotechnic device 120 located in the combustion chamber 106 in the second portion 74 of the housing 70. The pyrotechnic device 120 includes a radially extending, annular first surface 122 which abuts the annular third surface portion 112 in the combustion chamber 106. Axially extending, cylindrical second and third surfaces 124 and 126, respectively, of the pyrotechnic device 120 abut the cylindrical first and second surfaces 108 and 110, respectively, in the combustion chamber 106 in the housing 70. The crimpable flange 116 of the housing 70 crimps over a radially extending, annular fourth surface 128 of the pyrotechnic device 120 to secure the device in the combustion chamber 106.

The pyrotechnic device 120 includes a gas generating material which, when actuated by a flow of electric current, ignites and combusts to generate pressurized gas and thereby increase the pressure in the combustion chamber 106 and the pressure chamber 80 in the housing 70. The pyrotechnic device 120 is electrically actuatable over lead wires 130. At ambient temperatures exceeding 220° C., the pyrotechnic gas generating material of the pyrotechnic device 120 can auto-ignite (i.e., self-actuate).

The pretensioning device 40 further includes a pressure relief plug 140 partially disposed in the vent passage 86 in the first portion 72 of the housing 70. The pressure relief plug 140 is centered on the axis B and is made of a polymeric material, preferably Nylon 6, which melts at temperatures over 200° C.

The pressure relief plug 140 has a head portion 142 and a shank portion 144. The head portion 142 is preferably circular in cross-section, but could alternatively have a cross-section of a different shape. The head portion 142 of the pressure relief plug 140 is disposed in the pressure chamber 80 in the housing 70. The head portion 142 has a cylindrical outer surface 146 centered on the axis B (FIGS. 3 and 4). The head portion 142 has a circumference which is defined by the cylindrical outer surface 146 and which is larger than the circumference of the vent passage 86. The head portion 142 also has an outside diameter which is larger than the inside diameter of the vent passage 86.

The head portion 142 of the pressure relief plug 140 includes an upper surface 148 (FIGS. 5 and 6) facing the inside of the pressure chamber 80. The upper surface 148 is arcuate and is shaped as a part of a cylinder centered on the axis A. The upper surface 148 has a larger radius of curvature than the radius of curvature of the first cylindrical surface 82 defining the pressure chamber 80. The upper surface 148 of the head portion 142 connects with the cylindrical outer surface 146.

The head portion 142 of the pressure relief plug 140 further includes first and second underside surfaces 150 and 152 facing the first cylindrical surface 82 defining the pressure chamber 80 in the first portion 72 of the housing 70 (FIGS. 4, 5 and 8). The first and second underside surfaces 150 and 152 are concentric. The first underside surfaces 150 connects with the cylindrical outer surface 146 in the head portion 142. The first underside surface 150 is arcuate and is shaped as a part of a cylinder centered on the axis A. The radius of curvature of the first underside surface 150 is equal to the radius of curvature of the first cylindrical surface 82 defining the pressure chamber 80. Accordingly, the first underside surface 150 engages the first cylindrical surface 82.

The second underside surface 152 in the head portion 142 of the pressure relief plug 140 extends generally radially between the first underside surface 150 and the shank portion 144 of the plug 140. The second underside surface 152 is arcuate and is recessed into the head portion 142 from the first underside surface 150. Accordingly, the second underside surface 152 does not engage the first cylindrical surface 82 defining of the pressure chamber 80.

The shank portion 144 of the pressure relief plug 140 is preferably cylindrical in shape, but could alternatively have a shape which is other than cylindrical. The shank portion 144 has a cylindrical outer surface 156 and is partially disposed in the vent passage 86 in the housing 70. The cylindrical outer surface 156 defines a circumference for the shank portion 144 which is less than the circumference of the head portion 142 of the pressure relief plug 140. The circumference of the shank portion 144 is approximately equal to the circumference of the vent passage 86 and thus engages the third cylindrical surface 90 defining the vent passage. The shank portion 144 also has an outside diameter which is approximately equal the inside diameter of the vent passage 86.

The shank portion 144 has an end portion 160 which includes a pair of deflectable legs 162 separated by a V-shaped groove 164. The legs 162 are symmetrical about a plane extending through the center of the V-shaped groove 164. Each leg 162 has a partially cylindrical surface portion 166, a tapered surface portion 168, a hook surface portion 170, and a planar surface portion 172 (FIGS. 5, 6 and 8).

The planar surface portions 172 of the legs 162 oppose one another to define the V-shaped groove 164. The tapered surface portion 168 of each leg 162 tapers radially outwardly from a respective terminal end 174 of each leg 162 toward the head portion 142 of the pressure relief plug 140. The hook surface portion 170 of each leg 162 is planar and extends radially outward from the cylindrical outer surface 156 of the shank portion 144 until it meets its respective tapered surface portion 168. The partially cylindrical surface portion 166 of each leg 162 extends axially between the tapered surface portion 168 and the hook surface portion 170. The hook surface portions 170 are spaced from the first underside surface 150 in the head portion 142 of the pressure relief plug 140 by a second distance S2 (FIG. 3).

In a free condition, the end portion 160 of the shank portion 144 has an oval shape when viewed from below (see FIG. 7). This oval shape is larger than the diameter of the vent passage 86 in the housing 70. Therefore, when the end portion 160 is inserted into the vent passage 86 from inside the pressure chamber 80, the tapered surface portions 168 of the legs 162 engage the third cylindrical surface 90 defining the vent passage 86 in the housing 70. Axial pressure on the head portion 142 of the plug 140 causes the legs 162 to deflect radially inward toward one another. This deflection of the legs 162 tends to close the V-shaped groove 164 in the end portion 160 of the pressure relief plug 140. The end portion 160 then assumes a generally circular shape having a diameter which is slightly less than the diameter of the vent passage 86. This generally circular shape allows the pressure relief plug 140 to be inserted into the vent passage 86 as illustrated in FIG. 6.

When the pressure relief plug 140 is inserted completely into the vent passage 86 in the housing 70, the legs 162 on the plug 140 move radially outward to form a snap action connection with the housing 70 (FIG. 5). The second distance S2 between the hook surfaces 170 in the end portion 160 of the plug 140 and the first underside surface 152 in the head portion 142 is, however, slightly less than the first distance S1 between the first cylindrical surface 82 and the outer surface 78 in the first portion 72 of the housing 70. Accordingly, the plug 140 is longitudinally stretched slightly when installed in the vent passage 86, which helps to maintain a tight seal in the vent passage.

The pretensioning device 40 further includes a piston 180 in the piston chamber 56 in the tubular member 50. The piston 180 is cylindrical in shape and is centered on the axis A. The piston 180 has a cylindrical outer surface 182 which slidingly engages the inner surface 52 of the tubular member 50.

A cable 184 couples the slide 42 for movement with the piston 180. A first end portion 186 (FIG. 2) of the cable 184 is connected to the slide 42 and a second end portion 188 (FIG. 3) of the cable 184 is connected to the piston 184 in a known manner (not shown). The cable 184 extends through the axial passage 84 in the housing 70 and through the pressure chamber 80.

The seat belt system 10 (FIG. 1) includes a system controller 190 mounted in the vehicle. The system controller 190 is electrically connected to the pyrotechnic device 120 by the lead wires 130. The system controller 190 preferably comprises a microcomputer or microprocessor. A crash sensor 192 mounted on the vehicle body 18 is also electrically connected to the system controller 190. The crash sensor 192 senses conditions indicative of a vehicle collision, such as sudden vehicle deceleration.

Under normal driving conditions, the slide 42 (FIG. 2) connected to the seat belt buckle 26 is frictionally held in an upper portion of the slot 44 in the anchor plate 46. The cable 184 interconnecting the piston 180 and the slide 42 is taut.

In the event of sudden vehicle deceleration such as occurs in a collision, the crash sensor 192 sends a collision detection signal to the system controller 190. The pyrotechnic device 120 is actuated by an electric signal from the system controller 190 over the lead wires 130.

When the pyrotechnic device 120 is actuated, the resulting combustion products of the pyrotechnic device rapidly produce a significant increase in pressure inside the combustion chamber 106 and the pressure chamber 80 in the housing 70. The pressure relief plug 140 blocks the vent passage 86 so that the increased pressure cannot escape from the pressure chamber 80 through the vent passage. The increase in pressure in the pressure chamber 80 also increases the pressure in the piston chamber 56 in the tubular member 50. The increased fluid pressure in the piston chamber 56 applies force against the piston 180. The force against the piston 180 causes the piston to move in a direction indicated by arrow C in FIG. 3.

As the piston 180 moves in the chamber 56 in the tubular member 50, the cable 184 is pulled along with the piston. This pulling of the cable 184 causes the slide 42, to which the cable is connected, to be pulled downward in the slot 44 in the anchor plate 46, in the direction of arrow C (FIG. 2). The downward movement of the slide 42 pulls the seat belt buckle 26 and the tongue assembly 22 downward, thereby removing any slack in the seat belt webbing 16 and tensioning the belt webbing.

In the event that the vehicle is subjected to an ambient temperature in excess of 200° C., such as occurs in a fire, for example, the material of the pressure relief plug 140 melts, leaving the vent passage 86 unblocked. Therefore, should the pyrotechnic material of the pyrotechnic device 120 auto-ignite due to the high ambient temperature, the resulting increased pressure in the pressure chamber 80 will be vented through the vent passage 86. Venting of the pressure chamber 80 will prevent unintended actuation of the pretensioning device 40.

It is contemplated that the pressure relief plug 140 according to the present invention could also be used with inflatable vehicle occupant restraint systems. More specifically, the pressure relief plug 140 described above could be used in an air bag inflator having a pyrotechnic device. In such an application, the pressure relief plug would function in the same manner to prevent deployment of the air bag when ambient temperatures exceed 220° C. and auto-ignition of the material in the pyrotechnic device could occur.

From the above description of the invention, those skilled in the art will perceive improvements, changes and modifications. Such improvements, changes and modifications within the skill of the art are intended to be covered by the appended claims.

Having described the invention, we claim:

1. Apparatus comprising:
    a housing defining a chamber, said housing also defining a vent passage communicating said chamber with the atmosphere outside said housing;
    a gas generator associated with said housing and, when actuated, generating gas in said chamber; and
    a pressure relief plug blocking gas flow through said vent passage when the pressure relief plug is at a first temperature, said pressure relief plug being made of a material which melts at a second temperature above said first temperature causing said vent passage to become unblocked, said pressure relief plug being insertable into said vent passage and having a snap action connection with said housing.

2. Apparatus as defined in claim 1 wherein said vent passage has a predetermined circumference where said vent passage meets said chamber, said pressure relief plug having a head portion located in said chamber with a circumference larger than said predetermined circumference of said vent passage, said pressure relief plug having a shank portion with a circumference smaller than said circumference of said head portion, said shank portion also having an end portion which includes a pair of legs which move toward each other upon insertion into said vent passage and which move away from each other when moved out of said passage.

3. Apparatus as defined in claim 2 wherein said pair of legs have terminal ends, said pair of legs having surfaces which are tapered radially outwardly from the terminal end toward said head, said tapered surfaces engaging said housing to deflect said legs toward each other as said legs are inserted into said vent passage.

4. Apparatus as defined in claim 2 wherein each of said pair of legs has a hook surface engaging a first surface of said housing and said head has an underside surface for engaging a second surface of said housing defining said chamber.

5. Apparatus as defined in claim 4 wherein said hook surfaces and said underside surface of said pressure relief plug are spaced apart by a first distance, said first and second surfaces of said housing being spaced apart by a second distance greater than said first distance.

6. Apparatus as defined in claim 1 further comprising a movable member in said chamber and connecting means for connecting said movable member with seat belt webbing which is extensible about an occupant of a vehicle, said movable member being movable by pressurized gas generated by said gas generator to pretension the seat belt webbing.

* * * * *